United States Patent
Hashizume

(10) Patent No.: US 6,700,683 B1
(45) Date of Patent: Mar. 2, 2004

(54) IMAGE READING APPARATUS

(75) Inventor: Yusuke Hashizume, Tokyo (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 593 days.

(21) Appl. No.: 09/621,459

(22) Filed: Jul. 21, 2000

(30) Foreign Application Priority Data

Jul. 23, 1999 (JP) .......................... 11-209579

(51) Int. Cl.$^7$ ................................ H04N 1/04
(52) U.S. Cl. .............. 358/461; 358/474; 358/446; 358/464
(58) Field of Search ................ 358/445, 446, 358/464, 461, 534

(56) References Cited

U.S. PATENT DOCUMENTS 4,831,458 A * 5/1989 Watanabe .................. 358/443
5,099,341 A * 3/1992 Nosaki et al. ............... 358/461
5,282,060 A * 1/1994 Kizu et al. .................. 358/461

FOREIGN PATENT DOCUMENTS

JP 10-93783 4/1998
JP 11-341236 12/1999

* cited by examiner

Primary Examiner—Edward Coles
Assistant Examiner—Heather D Gibbs
(74) Attorney, Agent, or Firm—Foley & Lardner

(57) ABSTRACT

Disclosed is an image reading apparatus that can change the amounts of light of an exposure lamp at the time of reading a white reference value (shading correction value) and at the time of reading an image, or changing a signal amplification factor of an amplification section for amplifying the output of a CCD line sensor, by using a white-level correction value which has been read at the time of assembling and adjusting the apparatus. This can provide high-quality images without performing complex image processing even if an indicator is placed at such a location where a user is easy to see and use it.

8 Claims, 4 Drawing Sheets

IMAGE READING APPARATUS

CROSS-REFERENCE TO RELATED APPLICATIONS

This application is based upon and claims the benefit of priority from the prior Japanese Patent Application No. 11-209579, filed Jul. 23, 1999, the entire contents of which are incorporated herein by reference.

BACKGROUND OF THE INVENTION

The present invention relates to an image reading apparatus which reads the image of a document on a document table and performs shading correction on the read image based on a reference signal acquired from a white reference plate.

Generally, a digital copying machine or the like comprises a scanner section for reading an image and a printer section for printing the image read by the scanner section.

The scanner section uses a CCD line sensor for reading an image. The level of the voltage that is stored in the CCD line sensor is greatly affected by a variation in exposure lamp, a time-dependent reduction in illuminance and a variation in the pixels of the CCD line sensor. In this respect, the white level and black level are set immediately before reading an image so that the same image can be copied under any condition. This process is called shading correction.

Such a scanner section uses white and black shading correction plates (hereinafter referred to as "white reference plate" and "black reference plate", respectively), reads signals of several lines for each of the white reference plate and the black reference plate, averages the signal levels to provide reference white and black levels, and corrects a variation in a read image based on the white level and black level. To ensure copying of the same image under any condition, the white reference plate is placed at such a position as to be in the vicinity of the document-reading start position and at the same height as the document surface as much as possible.

Note that the black reference plate is not essential and may be eliminated if the reference black level is generated from a signal obtained when the exposure lamp is turned off, such as the time when the image reading apparatus is powered on.

The following problems arise when the white reference plate in the above-described scanner section is placed in the vicinity of the document-reading start position or at the same height as the document surface.

1. Depending on where the white reference plate is placed, the scanner section cannot be provided with an indicator, a part of the functions of a copying machine, which indicates the scanning area of a document.
2. Because of the restriction on where to attach the indicator, it becomes difficult for a user to determine the document scanning area.
3. The problem 2 is likely to result in miscopying or the like to wastefully consume expendable supplies.

A description will now be given of the problems that arise when the indicator is provided in the scanner section at such a position where a user can easily use (see) it.

1. When the white reference plate is placed at the same height as the document surface, it cannot be placed in the vicinity of the document-reading start position, so that the same image cannot be copied under any condition. This may result in wasteful consumption of expendable supplies.
2. When the white reference plate is placed in the vicinity of the document-reading start position, it cannot be placed at the same height as the document surface. This produces a difference between the white level acquired at the time of scanning the white reference plate and the white level acquired at the time of scanning a document, so that a proper image cannot be copied, resulting in wasteful consumption of expendable supplies.

In other words, when the indicator is placed at the position where a user easily see and use it, the difference between the length of the optical path (optical path length) from the exposure lamp at the time of scanning the white reference plate and the length of the optical path from the exposure lamp at the time of scanning a document produces a difference between the white level of the white reference plate scanned by the CCD line sensor and the white level of the document scanned by the CCD line sensor. This results in a difference between in the density of the output image.

3. In the case of a fast copying machine or the like, the white reference plate is positioned near the document-reading start position in order to shorten the cycle time. Therefore, the white reference plate cannot be placed at the same height as the document surface. This produces a difference between the white level acquired at the time of scanning the white reference plate and the white level acquired at the time of scanning a document, so that a proper image cannot be copied, resulting in wasteful consumption of expendable supplies.
4. In the case where the white reference plate is placed at the same height as the document surface, when dust, an impurity or the like sticks on the white reference plate, a finished image may undesirably have a white line, black line, uneven density and so forth, as mentioned in Jpn. Pat. Appln. KOKAI Publication No. 93783/1998.

BRIEF SUMMARY OF THE INVENTION

Accordingly, it is an object of the present invention to provide an image reading apparatus which has a white reference plate in the vicinity of the document-reading start position, but not at the same height as the document surface, and which can always execute accurate shading correction to provide high-quality images.

To achieve the above object, according to one aspect of this invention, there is provided an image reading apparatus for reading an image of a document placed on a document table by scanning the document using light irradiation means, which comprises a white reference plate located outside a document scanning area near the document table and at a position of a second optical path length between the light irradiation means and the white reference plate, which is different from a first optical path length between the light irradiation means and the document table at a time of scanning the document; setting means for setting a ratio based on a difference between the first optical path length between the light irradiation means and the document table and the second optical path length between the light irradiation means and the white reference plate; change means for changing an amount of light at a time of scanning each of the white reference plate and the document table with the light irradiation means, based on the set ratio; and correction means for, with the amount of light changed by the change means, correcting the read image at a time of scanning the document table, based on a reference signal at a time of scanning the white reference plate.

According to another aspect of this invention, there is provided an image reading apparatus for reading an image of a document placed on a document table by scanning the document using light irradiation means, which comprises a white reference plate located outside a document scanning area near the document table and at a position of a second optical path length between the light irradiation means and the white reference plate, which is different from a first optical path length between the light irradiation means and the document table at a time of scanning the document; setting means for setting a ratio based on a difference between the first optical path length between the light irradiation means and the document table and the second optical path length between the light irradiation means and the white reference plate; photoelectric conversion means for converting an amount of reflected light at a time of irradiating the white reference plate with the light irradiation means and an amount of reflected light at a time of irradiating the document table with the light irradiation means into electric signals; amplification means for amplifying that electric signal which is acquired by the photoelectric conversion means and corresponds to the amount of reflected light from the white reference plate and that electric signal which is acquired by the photoelectric conversion means and corresponds to the amount of reflected light from the document table by different amplification factors based on the ratio set by the setting means; and correction means for correcting the electric signal corresponding to the document table amplified by the amplification means, based on the electric signal corresponding to the white reference plate amplified by the amplification means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will now be described with reference to the accompanying drawings.

Figure 1:
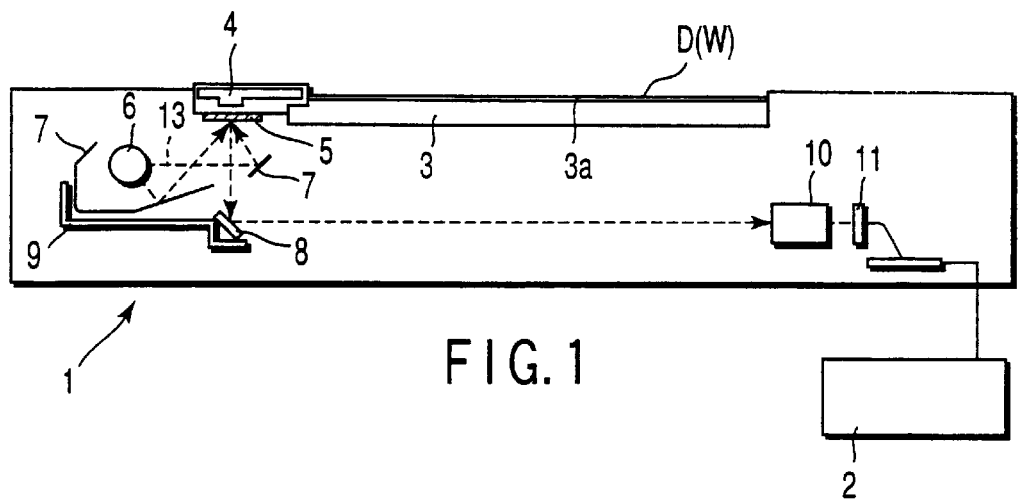
FIGS. 1 and 2 are diagrams illustrating the internal structure of an image reading apparatus according to one embodiment of this invention.
Figure 2:
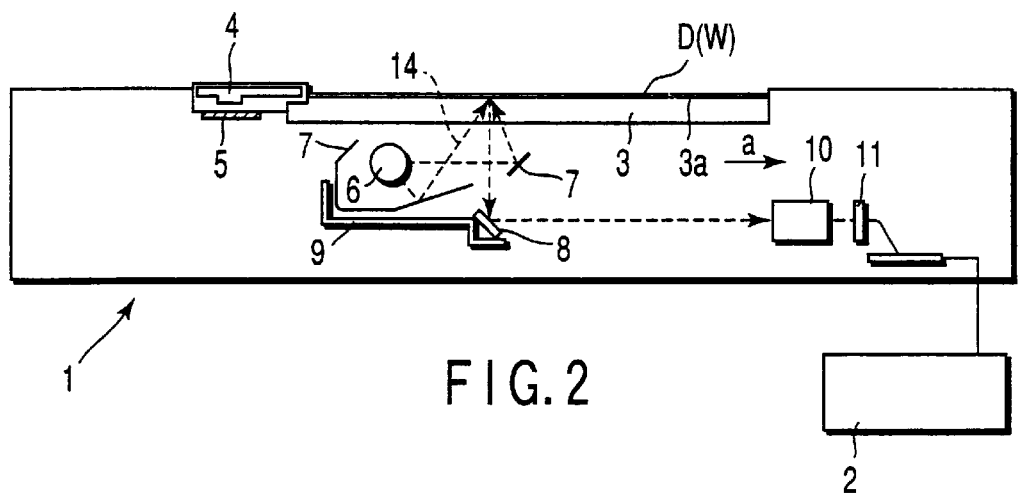

FIGS. 1 and 2 illustrate a digital copying machine comprising a scanner section 1 and a printer section 2, and, particularly, shows the internal structure of the scanner section 1.

As shown in FIGS. 1 and 2, provided on the top portion of the scanner section 1 are a document table 3 formed of transparent glass and an indicator section 4 located to the left of the document table 3. The document table 3 has a document-placing surface 3a on which a document D or a white chart W is to be placed. The indicator section 4 serving as a document scale indicates a document reading range (one end portion). Provided under the indicator section 4 is a white reference plate (shading correction plate) 5 which is used to read a reference value for shading correction. The white reference plate 5 is located at a height different from the height of the document-placing surface 3a (lower than the document-placing surface 3a) and in a non-document-placing area. The white chart W has a reflectance similar to that of the white reference plate 5, and is used when setting a white-level correction value at the time of assembling and adjusting the image reading apparatus which will be discussed later.

The scanner section 1 has an exposure lamp (halogen lamp, fluorescent lamp, xenon lamp or the like) as light irradiation means which illuminates the document-placing surface (document surface) 3a of the document table 3, a reflector 7 so disposed as to surround this exposure lamp 6, and a mirror 8 for deflecting reflected light from the document in a predetermined direction. Those exposure lamp 6, reflector 7 and mirror 8 are mounted to a carriage 9 which is located under the document table 3.

The carriage 9 is so provided as to be movable in parallel to the white reference plate 5 and the document table 3, and is caused to reciprocate under the white reference plate 5 and the document table 3 by a drive motor via an unillustrated toothed belt or the like.

Disposed below the document table 3 are an image-forming lens 10 which condenses reflected light from the mirror 8 on the carriage 9 and a CCD line sensor 11 which receives the condensed reflected light and performs photoelectric conversion of the reflected light. The image-forming lens 10 is provided in a plane including the optical axis of light deflected by the mirror 8 and is movable by a drive mechanism. As the image-forming lens 10 moves itself, the image of the reflected light is formed by a predetermined magnification. The CCD line sensor 11 photoelectrically converts the incident reflected light into a corresponding electric signal. This electric signal is input to an image processing circuit 26 to be discussed later, which is installed on an image processing board 12 provided in the vicinity of the CCD line sensor 11. The image data that has undergone a predetermined process in the image processing circuit 26 is supplied to the printer section 2.

As the carriage 9 is moved (in the direction of an arrow a), the exposure lamp 6 irradiates light on the white reference plate 5 and the document-placing surface 3a of the document table 3 in that order. At this time, an optical path length 13 (FIG. 1) from the exposure lamp 6 to the white reference plate 5 at the time the white reference plate 5 is irradiated by the exposure lamp 6 is set shorter than an optical path length 14 (FIG. 2) from the exposure lamp 6 to the document-placing surface 3a of the document table 3 at the time the document-placing surface 3a is irradiated by the exposure lamp 6 (optical path length 13<optical path length 14).

The digital copying machine is provided with an operation panel (not shown) which has keys to instruct various copying conditions (setting of the document size, etc.) and the start of a copying operation.

Figure 3:
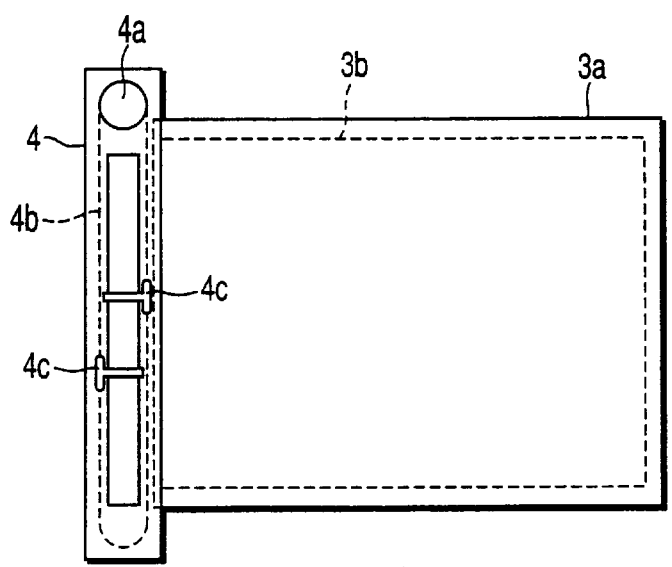
FIG. 3 is diagram showing the schematic structure of an indicator section.

FIG. 3 is diagram schematically showing the structure of the indicator section 4.

In accordance with an instruction on the document size given from the operation panel by a user (operator), two indicators 4c are driven via an indicator drive belt 4b by an indicator motor 4a. The indicators 4c can be changed to a maximum scan size 3b in the main scan direction, and the user sets a document based on the scanning area indicated by the indicators 4c, at the time of an equal magnification or a different magnification.

Figure 4:
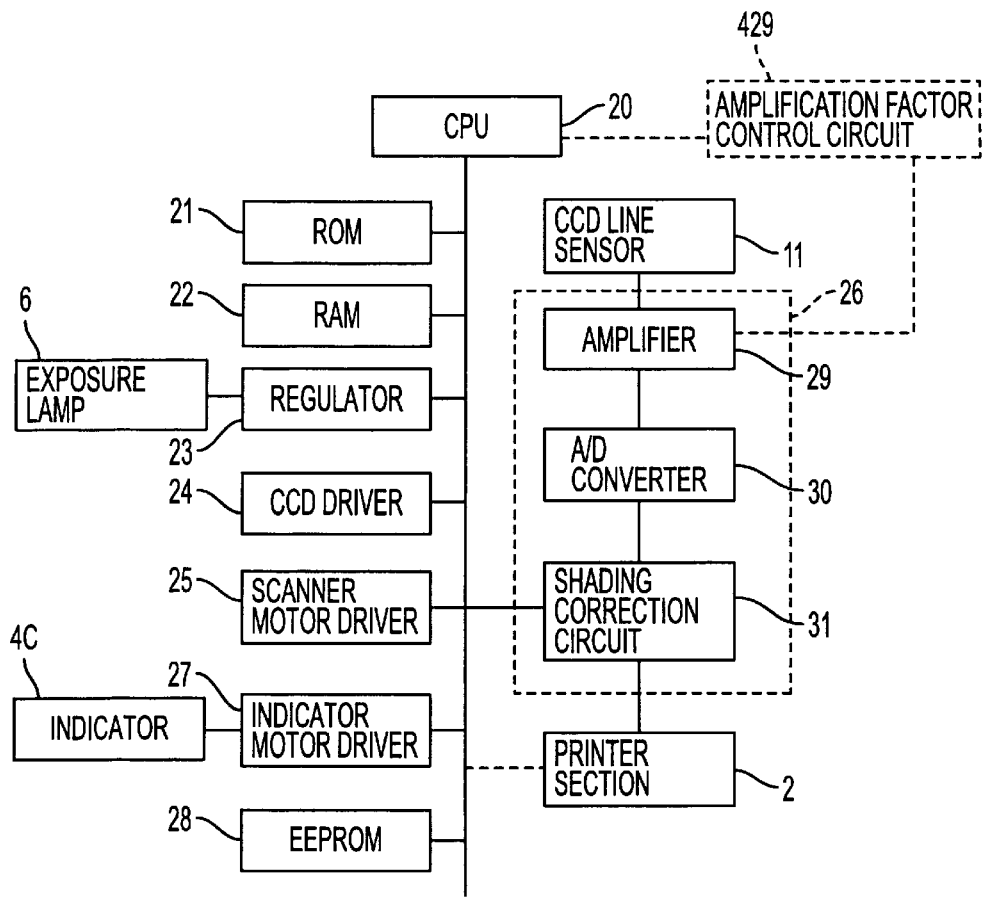
FIG. 4 is block diagram schematically showing the control system of the image reading apparatus.

FIG. 4 shows the control system of the scanner section 1.

The scanner section 1 comprises a CPU 20 which performs the general control of the scanner section 1, a ROM 21 holding a control program, etc., a RAM 2 for storing various kinds of data, a regulator 23 for controlling the activation and the amount of light of the exposure lamp 6, a CCD driver 24 for driving the CCD line sensor 11, a scanner motor driver 25 which drives a motor for moving the carriage 9, the aforementioned image processing circuit 26 which processes signals from the CCD line sensor 11, an indicator motor driver 27 which drives the indicator motor 4a, and an EEPROM 28 as a non-volatile memory which retains data even when the scanner section 1 is powered off.

The regulator 23 is designed to control the amount of light of the exposure lamp 6 to a first amount of light (the amount of light at the time of scanning a document) when the irradiation position of the exposure lamp 6 corresponds to the document table 3 and control the amount of light of the exposure lamp 6 to a second amount of light (the amount of light at the time of scanning the white reference plate 5) when the irradiation position of the exposure lamp 6 corresponds to the white reference plate 5 (the second amount of light<the first amount of light).

The alteration of the amount of light is accomplished by changing the control pulse duty ratio, for example, in the case where PWM (Pulse Width Modulation) control is used in setting the output voltage. Any available method may be used to vary the amount of light.

As the indicators 4c are placed at the position where a user can easily see and use them as in the above-described structure, the optical path length 13 from the exposure lamp 6 to the white reference plate 5 at the time of scanning the white reference plate 5 differs from the optical path length 14 from the exposure lamp 6 to the document-placing surface 3a of the document table 3 at the time of scanning a document (optical path length 13<optical path length 14). To prevent the white level read by the CCD line sensor 11 from varying due to this difference in optical path length (to avoid a difference in the density of an image to be scanned), the amount of light is changed between the case of scanning the white reference plate 5 and the case of scanning a document image, based on the difference in optical path length.

This will be discussed specifically below. The ratio of an electric signal corresponding to the amount of reflected light acquired by scanning the white reference plate 5 to an electric signal corresponding to the amount of reflected light acquired by scanning the white chart W placed on the document table 3, both scannings done with the same amount of light, is preset as a white-level correction value WC (the amount of a change from the first amount of light) based on the difference in optical path length.

At the time the white reference plate 5 is scanned prior to scanning of a document, the amount of light irradiated from the exposure lamp 6 is controlled to a second amount of light which is acquired by multiplying the first amount of light by the white-level correction value WC. At the time of actually scanning the document thereafter, the amount of light irradiated from the exposure lamp 6 is controlled to the first amount of light.

The white-level correction value WC indicates the ratio of the amount of reflected light from the white reference plate 5 to the amount of reflected light from the white chart W based on the difference between the optical path length 13 from the exposure lamp 6 to the white reference plate 5 at the time of irradiating the white reference plate 5 with the exposure lamp 6 and the optical path length 14 from the exposure lamp 6 to the white chart W at the time of irradiating the white chart W with the exposure lamp 6.

The white-level correction value WC is computed by dividing the value (white level WB of the white chart W) of the sum of all electric signals associated with reflected light for predetermined lines from the white chart W by the value (white level WA of the white reference plate 5) of the sum of all electric signals associated with reflected light for predetermined lines from the white reference plate 5. That is, WC=WB/WA.

The image processing circuit 26 comprises an amplifier 29 for amplifying an analog signal supplied from the CCD line sensor 11, an A/D converter 30 for converting the analog signal amplified by the amplifier 29 to a digital signal, and a shading correction circuit 31 for correcting an electric signal from the CCD line sensor 11, which reflects uneven illumination by the exposure lamp 6, a change in ambient temperature or the like, by using a shading correction value (reference signal).

The shading correction value is for correcting a change in an electric signal from the CCD line sensor 11, which is affected by uneven illumination by the exposure lamp 6, a change in ambient temperature or the like, and is acquired from an electric signal from the CCD line sensor 11 associated with the amount of reflected light from the white reference plate 5 obtained before scanning the document D placed on the document table 3.

A routine for setting the white-level correction value WC is carried out at the time of assembling and adjusting the copying machine before shipment.

With the white chart W placed on the document table and a setting mode for the white reference plate 5 instructed, the white reference plate 5 and the white chart W are scanned by the exposure lamp 6 with the amount of light used for scanning a document (first amount of light). As a result, the CPU 20 measures the white level WA of the white reference plate 5 and the white level WB of the white chart W and divides the white level WB by the white level WA to acquire the white-level correction value WC, and stores it in the EEPROM 28. (White-level correction value WC=white level WB/white level WA)

Figure 5:
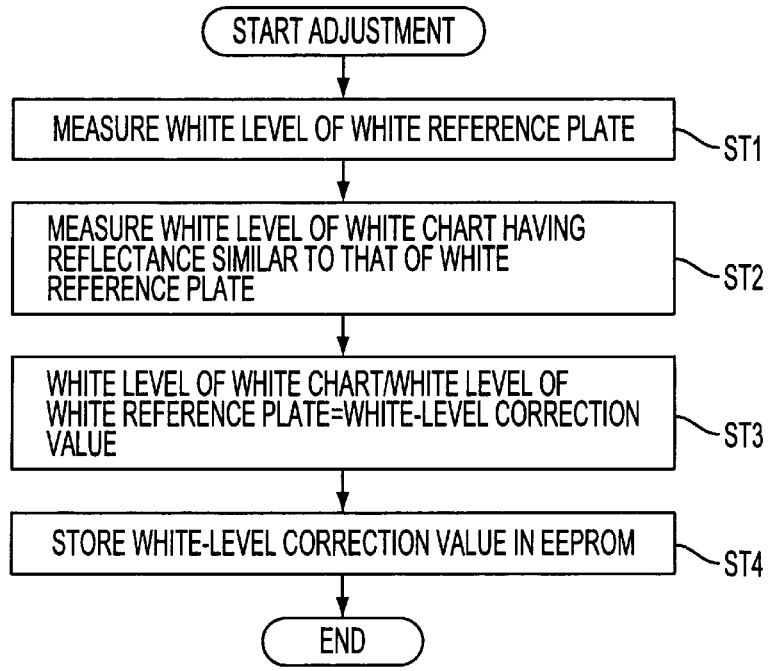
FIG. 5 is a flowchart for explaining a routine for setting a white-level correction value, which is carried out at the time of assembling and adjusting the image reading apparatus before shipment.

This routine for setting the white-level correction value WC will now be described with reference to the flowchart illustrated in FIG. 5.

Before starting this setting routine, the setting mode for the white reference plate 5 is instructed with the white chart W placed on the document table 3.

Then, the CPU 20 controls the regulator 23 to turn on the exposure lamp 6 (the same amount of light as that used in scanning a document), and controls the scanner motor driver 25 to move the carriage 9. As the carriage 9 moves, the exposure lamp 6 irradiates light on the white reference plate 5 and the document-placing surface 3a of the document table 3 in that order.

Under this situation, the CPU 20 measures the white level WA of the white reference plate 5 based on the electric signal from the CCD line sensor 11, which is associated with the reflected light from the white reference plate 5 (ST1) while the exposure lamp 6 is irradiating light on the white reference plate 5, and the CPU 20 measures the white level WB of the white chart W based on the electric signal from the CCD line sensor 11, which is associated with the reflected light from the white chart W (ST2) while the exposure lamp 6 is irradiating light on the white chart W.

Based on those measured results, the CPU 20 divides the white level WB by the white level WA (ST3) and stores the resultant value as the white-level correction value WC in the EEPROM 28 (ST4) after which the setting routine will be terminated.

The obtained white-level correction value WC indicates the ratio of the amount of reflected light from the white reference plate 5 to the amount of reflected light from the white chart W based on the difference between the optical path length 13 from the exposure lamp 6 to the white reference plate 5 at the time of irradiating the white reference plate 5 with the exposure lamp 6 and the optical path length 14 from the exposure lamp 6 to the white chart W at the time of irradiating the white chart W with the exposure lamp 6 (optical path length 13<optical path length 14).

The white level WA measured in step ST1 is the value of the sum of all the values of predetermined lines of pixel data obtained from the electric signal associated with the reflected light from the white reference plate 5, and the white level WB measured in step ST2 is the value of the sum of all the values of predetermined lines of pixel data obtained from the electric signal associated with the reflected light from the white chart W.

Figure 6:
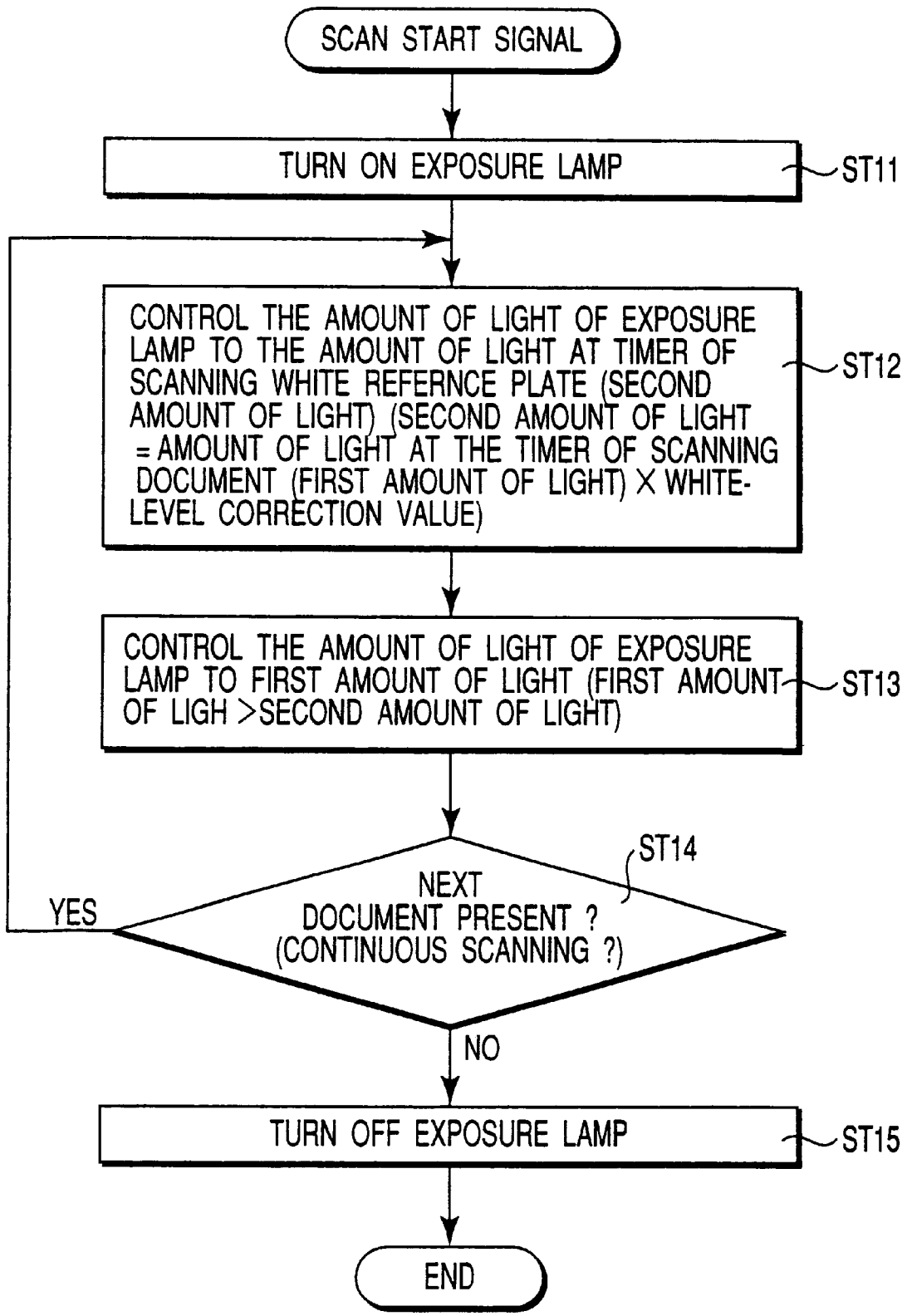
FIG. 6 is a flowchart for explaining a routine for controlling the amount of light of an exposure lamp at the time document is scanned after assembling and adjustment.

A description will now be given of a routine for scanning the document D after assembling and adjustment. The flowchart in FIG. 6 illustrates how to control the amount of light of the exposure lamp 6 at the time of this scanning.

A user sets plural sheets of documents D in an unillustrated ADF (Auto Document Feeder), performs various setting using the operation panel and then instructs the initiation of copying. At this time, the first document D is fed out by the ADF onto the document table 3. As the document D is placed there, a control section (not shown) which controls the entire copying machine sends a scan start signal to the CPU 20 of the scanner section 1.

In response to the scan start signal, the CPU 20 controls the regulator 23 to activate the exposure lamp 6 (ST11).

The CPU 20 multiplies the amount of light at the time of scanning a document (first amount of light) by the white-level correction value WC read from the EEPROM 28 to compute the amount of light at the time of scanning the white reference plate 5 (second amount of light), and causes the regulator 23 to control the amount of light of the exposure lamp 6 to the amount of light (second amount of light) used at the time of scanning the white reference plate 5 based on the computation result (ST12). With the amount of light from the exposure lamp 6 controlled to the second amount of light, the white reference plate 5 is scanned.

When scanning of the white reference plate 5 is carried out to the end surface thereof, the CPU 20 causes the regulator 23 to control the amount of light from the exposure lamp 6 to the amount of light (first amount of light) at the time of scanning a document (ST13). With the amount of light from the exposure lamp 6 controlled to the first amount of light, the document D is scanned.

After scanning the document D is completed, when the control section decides that there is no further document D in the ADF and sends a scan end signal (ST14), the CPU 20 causes the regulator 23 to turn off the exposure lamp (ST15) and terminates the scanning routine.

Although the white-level correction value WC is computed by using an arithmetic operation circuit in step ST12, the white-level correction value WC may be computed and stored in the EEPROM 28 beforehand.

When the same amount of light is irradiated by the exposure lamp 6 at the time of scanning the white reference plate 5 and at the time of scanning a document image as in the case of the prior art, the reflectance of the white reference plate is 76%±1%. In the case where the white chart W having a reflectance similar to that of the white reference plate 5 and a copying machine whose amount of light on the document surface is 900001× and whose scan speed is 65 cpm is used, the value of the output of the CCD line sensor when the amount of light from the exposure lamp is not changed between the time of scanning the white reference plate 5 and the time of scanning a document has a density level of about 30 to 40 (256 scales) when the output is a value obtained by scanning the white reference plate 5 and a density level of about 60 (256 scales) when the output is a value obtained by scanning the white chart W. It is understood from the above that the values obtained by scanning the white reference plate 5 and a document with the same amount of light clearly appear as a difference in white level.

By way of contrast, the above-described embodiment performs variable control of the amount of light of the exposure lamp 6 (halogen lamp, fluorescent lamp, xenon lamp or the like) at the time of scanning the white reference plate 5 based on the amount of light of the exposure lamp 6 at the time of scanning an image (at the time of scanning a document). Therefore, a life-dependent change in the amount of light of the exposure lamp 6 caused by the use of the exposure lamp 6 does not affect shading correction.

For example, the life-dependent change in the amount of light of a halogen lamp drops about 5% over 4000 hours. In the case of a fast copying machine (e.g., 65 cpm), however, the scan speed is 0.92 sec/sheet whereas in the case of a middle-speed copying machine (e.g., 22 cpm), it is 2.72 sec/sheet. Therefore, a change in the amount of light of the exposure lamp 6 per sheet at the time of scanning an image is nearly zero in both cases. If the white reference plate 5 and the document D are scanned with their optimal amounts of light, therefore, the life-dependent change in the amount of light of the exposure lamp 6 does not influence the shading correction.

As described above, the white reference plate 5 and the white chart W whose reflectance is similar to that of the white reference plate 5 are scanned with the same amount of light beforehand, and the white-level correction value WC based on which the amount of light of the exposure lamp 6 at the time of scanning the white reference plate 5 (second amount of light) is obtained is computed based on the white levels WA and WB acquired by the scanning and is then stored in the memory. Then, at the time of scanning the white reference plate 5 in the process of scanning the document D, the amount of light of the exposure lamp 6 is computed based on the white-level correction value WC and the amount of light of the exposure lamp 6 is controlled based on the computation result.

Even in the case where the optical path length 13 from the exposure lamp 6 to the white reference plate 5 at the time of scanning the white reference plate 5 differs from the optical path length 14 from the exposure lamp 6 to the document-placing surface 3a of the document table 3 at the time of scanning a document as a result of disposing the indicators 4c at the position where a user can easily see and use them as in the above-described structure, shading correction can be executed accurately and a high-quality image can be obtained without performing complicated image processing.

As mentioned above, the white reference plate 5 is not provided on the same plane as the document-placing surface 3a.

This design allows the indicators to be placed where a user can easily see and use them, making it possible to reduce wasteful copying, such as miscopying, by the user. If some dust, impurities or the like stick on the white reference plate 5, the provision of the white reference plate at the non-focusing position of the CCD line sensor 11 can suppress the production of defects (poor images).

According to the first embodiment, at the time of measuring the white levels WA and WB which are used in computing the white-level correction value WC, the white reference plate 5 and the white chart W are irradiated with the amount of light used at the time of scanning a document while the amount of light of the exposure lamp 6 is controlled to the amount of light used at the time of scanning a document, and then the white levels WA and WB are measured based on the reflected lights from the white reference plate 5 and the white chart W. However, the amount of light of the exposure lamp 6 that is irradiated on the white reference plate 5 and the white chart W is not limited to the amount of light used at the time of scanning a document but a different amount of light may be used as long as the white reference plate 5 and the white chart W are irradiated with the same amount of light.

In the above-described first embodiment, scanning is carried out by changing the amount of light of the exposure lamp 6 at the time of scanning the white reference plate 5 and the amount of light of the exposure lamp 6 at the time of scanning a document. This method however has to face a problem of the response characteristic of the exposure lamp caused by a change in the amount of light, and may not be employed in a fast copying machine.

Generally, the exposure lamp 6 is controlled by the regulator 23. According to the general performance of the regulator 23, however, the time for the lamp voltage to reach 61.5 V (900001× in the case of a copying machine having a scan speed of 65 cpm) from the enabling of a light-ON signal at the rated input voltage and rated current and during a repetitive lighting operation where soft start is not available is less than 100 msec. Because the amount of light is stable in the case of scanning the white reference plate 5, if the lamp voltage is about 50 to 70 V when scanning the white reference plate 5 and a voltage change to 61.5 V occurs, it would actually take about 30 to 40 msec for the lamp voltage to become stable.

In the case of a copying machine having a scan speed of 65 cpm and a process speed of 420 mm/sec, the scan speed for a 50% magnification becomes 840 mm/sec. If the distance between the scanning end position of the white reference plate 5 to the document-reading start position is 20 mm, it needs about 24 msec to cover this distance so that image scanning may start with an unstable amount of light.

In the case of a copying machine having a scan speed of 22 cpm and a process speed of 127 mm/sec, the scan speed for a 50% magnification becomes 254 mm/sec. Even if the distance between the scanning end position of the white reference plate 5 to the document-reading start position is 20 mm, the same as that of the fast copying machine, it only needs about 79 msec to cover this distance so that even when the amount of light is changed after scanning the white reference plate 5, the amount of light becomes stable when scanning a document starts.

A second embodiment to be discussed below is designed for a fast copying machine to cope with the problem of the response characteristic of the exposure lamp 6 which arises when the amount of light is changed and cannot be properly deal with the first embodiment.

According to the second embodiment, at the time of scanning a document in the first embodiment, a process of changing the amount of light at the time of scanning the white reference plate 5 based on the white-level correction value WC is not carried out, and instead, the amplification factor of the electric signal from the CCD line sensor 11 associated with the reflected light from the white reference plate 5 is changed based on the white-level correction value WC when the document is scanned.

That is, an amplification factor control circuit 429 is provided between the amplifier 29 and the CPU 20 in the block diagram of FIG. 4. This amplification factor control circuit 429 changes the amplification factor of the amplifier 29 by controlling a control voltage value under the control of the CPU 20.

Figure 7:
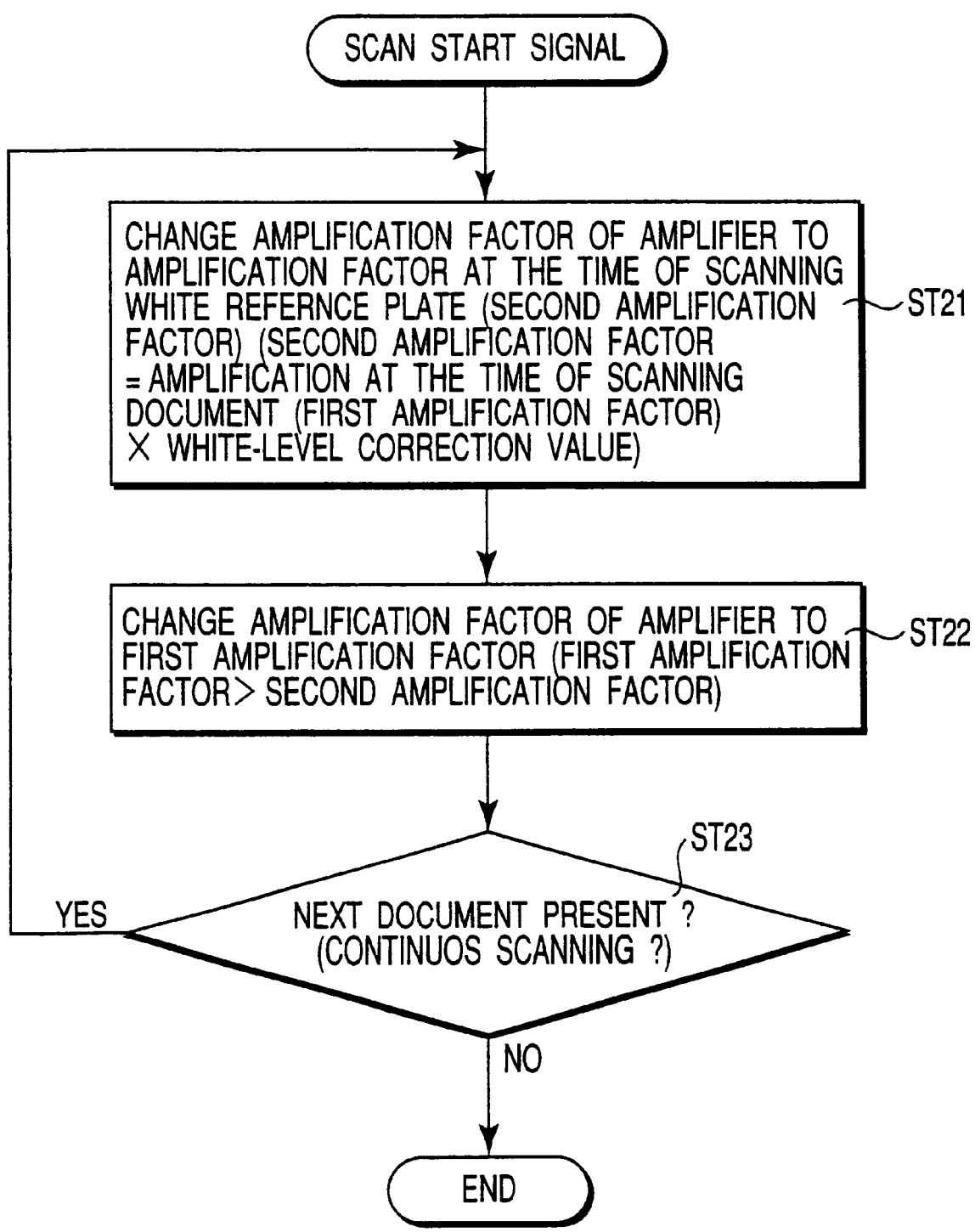
FIG. 7 is a flowchart for explaining a routine for controlling the amplification factor of an amplifier at the time a document is scanned after assembling and adjustment.

With this structure, the amplification factor control circuit 429 changes (decreases) the amplification factor of the amplifier 29 to the amplification factor based on the white-level correction value WC at the time of measuring the shading correction value (at the time of scanning the white reference plate 5), and then sets the amplification factor of the amplifier 29 back to the original one at the time of scanning the document. (See steps ST21 to ST23 shown in FIG. 7.).

As described above, the amount of light of the exposure lamp at the time of reading the white reference value (shading correction value) and the amount of light of the exposure lamp at the time of scanning an image are changed or the signal amplification factor of the amplification section for the output of the CCD line sensor is changed, both by using the white-level correction value that has been acquired and stored at the time of assembling and adjusting the image reading apparatus. Even if the indicators are placed where a user can easily see and use them, therefore, a high-quality image can be obtained without involving complicated image processing.

Although the foregoing descriptions of the first and second embodiments have been given of the case where the white reference plate is placed lower than the document table, this invention can be adapted to the case where the white reference plate is placed higher than the document table. In this case, the amount of light used at the time of measuring the shading correction value should be made greater than the amount of light used at the time of scanning a document in the first embodiment, whereas the amplification factor used at the time of measuring the shading correction value should be made greater than the amplification factor used at the time of scanning the document in the second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus for reading an image of a document placed on a document table by scanning said document using light irradiation means, comprising:

a white reference plate located outside a document reading area near said document table and at a position of a second optical path length between said light irradiation means and said white reference plate, which is different from a first optical path length between said light irradiation means and said document table at a time of scanning said document;

photoelectric conversion means for converting an amount of reflected light at a time of irradiating said white reference plate with said light irradiation means and an amount of reflected light at a time of irradiating said document table with said light irradiation means into electric signals;

setting means for setting a ratio of the electric signal which is acquired by said photoelectric conversion means when said white reference plate is irradiated by said light irradiation means while a white chart having a reflectance corresponding to said white reference plate is placed on said document table, to the electric signal which is acquired by said photoelectric conversion means when said white chart on said document table is irradiated by said light irradiation means;

change means for changing an amount of light at a time of scanning each of said white reference plate and said document table with said light irradiation means, based on said ratio set by said setting means; and correction means for, with said amount of light changed by said change means, correcting said read image at a time of scanning said document table, based on a reference signal at a time of scanning said white reference plate.

2. The image reading apparatus according to claim 1, wherein said second optical path length is shorter than said first optical path length.

3. An image reading apparatus for reading an image of a document placed on a document table by scanning said document using light irradiation means, comprising:

a white reference plate located outside a document reading area near said document table and at a position of a second optical path length between said light irradiation means and said white reference plate, which is different from a first optical path length between said light irradiation means and said document table at a time of scanning said document;

setting means for setting a ratio based on a difference between said first optical path length between said light irradiation means and said document table and said second optical path length between said light irradiation means and said white reference plate;

photoelectric conversion means for converting an amount of reflected light at a time of irradiating said white reference plate with said light irradiation means and an amount of reflected light at a time of irradiating said document table with said light irradiation means into electric signals;

change means for changing a first amount of light at a time of scanning said document table with said light irradiation means, said change means changes an amount of light at a time of scanning said white reference plate to a second amount of light based on said ratio set by said setting means; and output means for outputting a first electrical signal acquired by said photoelectric conversion means when said white reference plate is irradiated with said second amount of light by said light irradiation means, and a second electrical signal acquired based on the first electrical signal by said photoelectric conversion means when said document table is irradiated with said first amount of light by said light irradiation means.

4. The image reading apparatus according to claim 3, wherein said second optical path length is shorter than said first optical path length.

5. An image reading apparatus for reading an image of a document placed on a document table by scanning said document using light irradiation means, comprising:

a white reference plate located outside a document reading area near said document table and at a position of a second optical path length between said light irradiation means and said white reference plate, which is different from a first optical path length between said light irradiation means and said document table at a time of scanning said document;

photoelectric conversion means for converting an amount of reflected light at a time of irradiating said white reference plate with said light irradiation means and an amount of reflected light at a time of irradiating said document table with said light irradiation means into electric signals;

setting means for setting a ratio of the electric signal which is acquired by said photoelectric conversion means when said white reference plate is irradiated by said light irradiation means while a white chart having a reflectance corresponding to said white reference plate is placed on said document table, to the electric signal which is acquired by said photoelectric conversion means when said white chart on said document table is irradiated by said light irradiation means;

amplification means for amplifying the electric signal which is acquired by said photoelectric conversion means and corresponds to said amount of reflected light from said white reference plate and the electric signal which is acquired by said photoelectric conversion means and corresponds to said amount of reflected light from said document table by different amplification factors based on said ratio set by said setting means; and correction means for correcting said electric signal corresponding to said document table amplified by said amplification means, based on said electric signal corresponding to said white reference plate amplified by said amplification means.

6. The image reading apparatus according to claim 5, wherein said second optical path length is shorter than said first optical path length.

7. An image reading apparatus for reading an image of a document placed on a document table by scanning said document using light irradiation means, comprising:

a white reference plate located outside a document reading area near said document table and at a position of a second optical path length between said light irradiation means and said white reference plate, which is different from a first optical path length between said light irradiation means and said document table at a time of scanning said document;

setting means for setting a ratio based on a difference between said first optical path length between said light irradiation means and said document table and said second optical path length between said light irradiation means and said white reference plate;

photoelectric conversion means for converting an amount of reflected light at a time of irradiating said white reference plate with said light irradiation means and an amount of reflected light at a time of irradiating said document table with said light irradiation means into electric signals;

change means for changing, with respect to a first amplification factor for amplifying the electric signal which corresponds to said amount of said reflected light from said document table and is acquired by said photoelectric conversion means when said white reference plate is irradiated by said light irradiation means, an amplification factor used at a time of scanning said white reference plate is irradiated with said light irradiation means, based on said ratio set by said setting means; and second amplification means for amplifying said electric signal which corresponds to said amount of said reflected light from said white reference plate and is acquired by said photoelectric conversion means by said second amplification factor changed by said change means, and amplifying said electric signal which corresponds to said amount of said reflected light from said document table and is acquired by said photoelectric conversion means by said first amplification; and correction means for correcting said electric signal which corresponds to said amount of said reflected light from said document table and is amplified by said second amplification means, based on said electric signal which corresponds to said amount of said reflected light from said white reference plate and is amplified by said second amplification means.

8. The image reading apparatus according to claim 7, wherein said second optical path length is shorter than said first optical path length.

* * * * *